(12) United States Patent
Kawai et al.

(10) Patent No.: US 10,078,493 B2
(45) Date of Patent: *Sep. 18, 2018

(54) SECURED PSEUDO-RANDOM NUMBER GENERATOR

(71) Applicant: International Business Machines Corporation, Armonk, NY (US)

(72) Inventors: Yutaka Kawai, Tokyo (JP); Yohichi Miwa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/289,211

(22) Filed: Oct. 10, 2016

(65) Prior Publication Data

US 2018/0101360 A1  Apr. 12, 2018

(51) Int. Cl.
*G06G 7/58* (2006.01)
*G06F 7/58* (2006.01)

(52) U.S. Cl.
CPC .................... *G06F 7/584* (2013.01)

(58) Field of Classification Search
CPC ............. G06F 7/58; G06F 7/582; G06F 7/584
See application file for complete search history.

(56) References Cited

U.S. PATENT DOCUMENTS

| | | | |
|---|---|---|---|
| 4,852,023 A * | 7/1989 | Lee .......................... | H03K 3/84 331/78 |
| 5,790,666 A * | 8/1998 | Ooi .......................... | G06F 7/584 348/E5.108 |
| 7,860,912 B1 | 12/2010 | Gyugyi et al. | |
| 2009/0292751 A1 | 11/2009 | Schneider | |
| 2012/0281827 A1 | 11/2012 | Wan et al. | |
| 2013/0024490 A1 | 1/2013 | Stewart | |
| 2013/0170641 A1 | 7/2013 | El Assad et al. | |
| 2014/0237012 A1 | 8/2014 | Ikeda | |

(Continued)

FOREIGN PATENT DOCUMENTS

| | | |
|---|---|---|
| CN | 102707923 A | 10/2012 |
| JP | 2005529364 A | 9/2005 |
| JP | 2009506438 A | 2/2009 |

OTHER PUBLICATIONS

Forisek, Michal, "What are the pros and cons of using multiple random number generators and combine the outputs?", Written Feb. 3, 2014, 1 page, <https://www.quora.com/What-are-the-pros-and-cons-of-using-multiple-random-number-generators-and-combine-the-outputs>.

(Continued)

*Primary Examiner* — Chuong D Ngo
(74) *Attorney, Agent, or Firm* — Edward J. Wixted, III

(57) ABSTRACT

The present invention provides a method of generating a sequence of pseudo-random numbers which are difficult to predict. The method includes: (i) generating a plurality of candidate pseudo-random numbers by a respectively corresponding plurality of (differently structured) linear feedback shift registers; (ii) generating a "selector number" from one or more additional linear feedback shift registers; and (iii) selecting a candidate number from the plurality of candidate numbers, based on the "selection number" to produce a selected pseudo-random number for output.

16 Claims, 9 Drawing Sheets

(56) References Cited

U.S. PATENT DOCUMENTS

2014/0310527 A1* 10/2014 Veugen ................ H04L 9/3013
713/171

OTHER PUBLICATIONS

Kawai et al., "Secured Pseudo-Random Number Generator", U.S. Appl. No. 15/813,286, filed Nov. 15, 2017, 32 pages.
IBM Appendix P, list of patents and patent applications treated as related, filed herewith, 2 pages, Nov. 15, 2017.
Kawai et al., "Secured Pseudo-Random Number Generator", U.S. Appl. No. 15/973,557, filed May 8, 2018, 32 pages.
Kawai et al., "Secured Pseudo-Random Number Generator", U.S. Appl. No. 15/973,563, filed May 8, 2018, 32 pages.
IBM, "List of Patent Applications Treated As Pending", Appendix P, Filed Herewith, 2 pages.

* cited by examiner

OUTPUT SEQUENCE TABLE

ALL NUMBERS ARE HEXADECIMAL
EXCEPT FOR LSFR 420 (SELECTOR) WHICH IS IN BINARY

| LSFR | OUTPUT LINE | CYCLE 1 | CYCLE 2 | CYCLE 3 | CYCLE 4 | CYCLE 5 |
|---|---|---|---|---|---|---|
| 400A | 215-1 | D670 | EB38 | F59C | 7ACE | BD67 |
| 400B | 215-2 | 0E6A | 1CD5 | 39AA | 7354 | E6A8 |
| 400C | 215-3 | E270 | 7138 | 389C | 1C4E | 0E27 |
| 400D | 215-4 | 1E31 | 3CC2 | 7984 | F308 | F61B |
| 420 (SELECTOR) | [S1,S2] | [0,0] | [1,0] | [1,0] | [0,0] | [1,1] |
| SELECTED OUTPUT LINE | | 215-1 | 215-3 | 215-3 | 215-1 | 215-4 |
| OUTPUT SEQUENCE | | D670 | 7138 | 389C | 7ACE | F61B |

FIG. 6A

SELECTOR MAPPING TABLE

| S1 (LFSR 400B, BIT-8) | S2 (LFSR 400B, BIT-15) | INPUT LINE SELECTED FOR OUTPUT |
|---|---|---|
| 0 | 0 | 215-1 |
| 0 | 1 | 215-2 |
| 1 | 0 | 215-3 |
| 1 | 1 | 215-4 |

FIG. 6B

SECURED PSEUDO-RANDOM NUMBER GENERATOR

BACKGROUND OF THE INVENTION

The present invention relates generally to the field of pseudo-random number generation, and more specifically to generating sequences of pseudo-random numbers that are difficult to predict, yet easy to duplicate.

A sequence of random numbers is useful in many areas of science, research, mathematics and manufacturing, such as simulation, cryptography, medical research, statistical process control, and gaming, to name just a few.

In cases where random numbers are needed in a computational context, pseudo-random numbers which can be calculated by a computer are typically used.

A pseudo-random sequence of numbers, while being generated by a deterministic process, exhibits measures of statistical randomness. Some pseudo-random number generation processes can reproduce exactly the same sequence of numbers any number of times (if started with the same seed or set of seeds), which is useful for debugging some software applications.

SUMMARY

A method, apparatus, and/or computer program product performs the following operations (not necessarily in the following order): receiving, by a selector, a plurality of pseudo-random numbers (PRNs) including a first pseudo-random number (PRN), a second PRN, and a third PRN; (ii) selecting, from the plurality of PRNs, a selected PRN, based at least in part upon the first PRN; and (iii) outputting the selected PRN. The plurality of PRNs are generated by a corresponding plurality of pseudorandom number generators (PRNGs) respectively including a first PRNG, a second PRNG, and a third PRNG.

BRIEF DESCRIPTION OF THE DRAWINGS

FIG. 6A is an output sequence table which is helpful in understanding at least one embodiment of the present invention;

FIG. 6B is a selector mapping table which is helpful in understanding at least one embodiment of the present invention.

DETAILED DESCRIPTION

Some embodiments of the present invention generate a sequence of pseudo-random numbers by generating in parallel, and at each generation cycle, a plurality of candidate pseudo-random numbers using a plurality of linear feedback shift registers (LFSRs) and selecting for output, one of the candidate pseudo-random numbers (and discarding the others), based on a pseudo-random number generated by an independent LFSR. One pseudo-random number is output at each generation cycle.

Various methods and algorithms for generating a pseudo-random number sequence have been devised. Some conventional methods use a linear feedback shift register (LFSR) because the LFSR ensures a stable frequency characteristic, un-predictability, and a long period. LFSRs can be easily implemented in digital circuitry and/or with software.

An LFSR can be easily implemented irrespective of bit length. When implemented in digital circuitry, the circuitry scale is relatively small. An LFSR is capable of generating a pseudo-random number within one clock cycle.

The present invention relates to a method which can be compactly implemented in hardware, and generates an unpredictable random number sequence at a high speed.

Some embodiments of the present invention recognize one, or more, of the following facts, potential problems and/or potential areas for improvement with respect to the current state of the art: (i) a linear feedback shift register (LFSR) is not suited for encryption in some conventional methods because a future output can be predicted from an algorithm and a past output; (ii) in conventional pseudo-random number generators suitable for cryptographic applications, the circuit scale is relatively large and a relatively long time is taken to generate numbers; and (iii) although there is a simple method for subjecting normal pseudo-random numbers to a cryptographic hash function, even in this case, the implementing the cryptographic hash function is complex and takes a relatively long time to perform calculations.

The present invention will now be described in detail with reference to the Figures.

Figure 1:
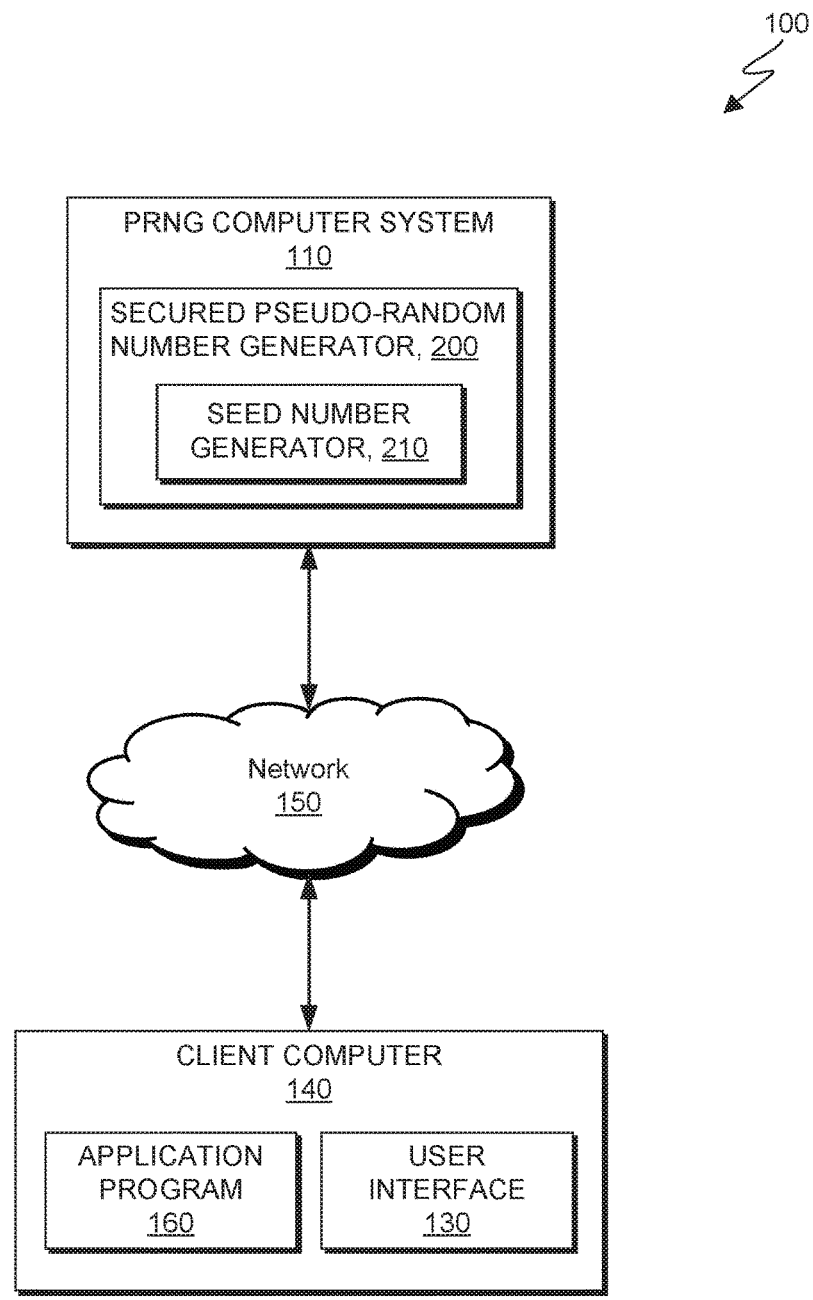
FIG. 1 is a functional block diagram showing a computing environment in accordance with some embodiments of the present invention.

FIG. 1 is a functional block diagram depicting a computing environment 100 in accordance with one or more embodiments of the present invention. Computing environment 100 includes: pseudo-random number generator computer system 110 (PRNG computer system 110); user interface 130; client computer 140; network 150; application program 160; and secured pseudo-random number generator 200 (secured PRNG 200). PRNG computer system 110, can be any of a desktop computer, a laptop computer, a specialized computer server, or any other computer system known in the art. In some embodiments, PRNG computer system 110 represents a computer system utilizing clustered computers and components to act as a single pool of seamless resources when accessed through network 150. In general, PRNG computer system 110 is representative of any electronic device, or combination of electronic devices, capable of executing machine-readable program instructions, as described in greater detail below, with reference to FIG. 7.

Some embodiments of the present invention include one, or more, of the following features, characteristics and/or advantages: (i) may be implemented, in part, using linear feedback shift registers (LFSRs); (ii) may be implemented with a relatively small circuit scale (in hardware implementations); (iii) may be implemented with relatively simple software; (iv) may lead to cost reduction when compared to a larger circuit scale; (v) operates a plurality of LFSRs in parallel to generate a corresponding plurality of candidate pseudo-random numbers (PRNs) for each number output in the PRN sequence; (v) pseudo-randomly selects one PRN from the plurality of candidate PRNs for each number in the PRN sequence; (vi) the pseudo-random selection is based on PRNs generated by a independent LFSR; and (vii) generates, at high speed, a PRN sequence that is relatively difficult to predict compared to typical PRNGs.

Some embodiments of the present invention comprise an apparatus for generating a sequence of pseudo-random numbers, in which future output of the sequence cannot easily be predicted from past outputs.

An LFSR is capable of generating pseudo-random numbers at a high speed and compact circuit resources. In embodiments where a plurality of LFSRs are implemented, the circuit scale is not increased. Because processing of the multiple LFSRs may be carried out in parallel, the multiple LFSRs may generate a corresponding plurality of candidate PRNs in one clock cycle.

In some embodiments of the present invention, it is difficult to predict the next numeric value from the past sequences, which satisfies a requirement for generating an unpredictable pseudo-random number sequence. However, a PRN sequence can be completely (and exactly) reproduced (at the generation side), for example to facilitate debugging of a circuit or application that uses the PRN sequence.

Applications using the output of some embodiments of the present invention may treat the generated pseudo-random number sequence as a truly random number sequence. The PRN sequence is required to be high in entropy (unpredictability), a requirement that is met in some embodiments of the present invention.

It is a desired aspect of an n-bit pseudo-random number sequence that, for each number generated in the sequence, the probability of generating any given value is $$1/2^n$$

where n is the bit-length of the PRNG (and/or the PRNs generated thereby).

However, an n-bit PRNG using an LFSR generates $[2^n-1]$ numbers in a pseudo-random sequence (the value "0" cannot be generated due to the nature of an LFSR). Therefore the probability at which any given number is generated in a given cycle is $$1/(2^n-1)$$

Some embodiments of the present invention provide a method of generating a sequence of pseudo-random numbers which are difficult to predict, by selecting from a plurality of PRNs, the selection based on another pseudo-random number, as will now be discussed with reference to FIG. 2.

Figure 2:
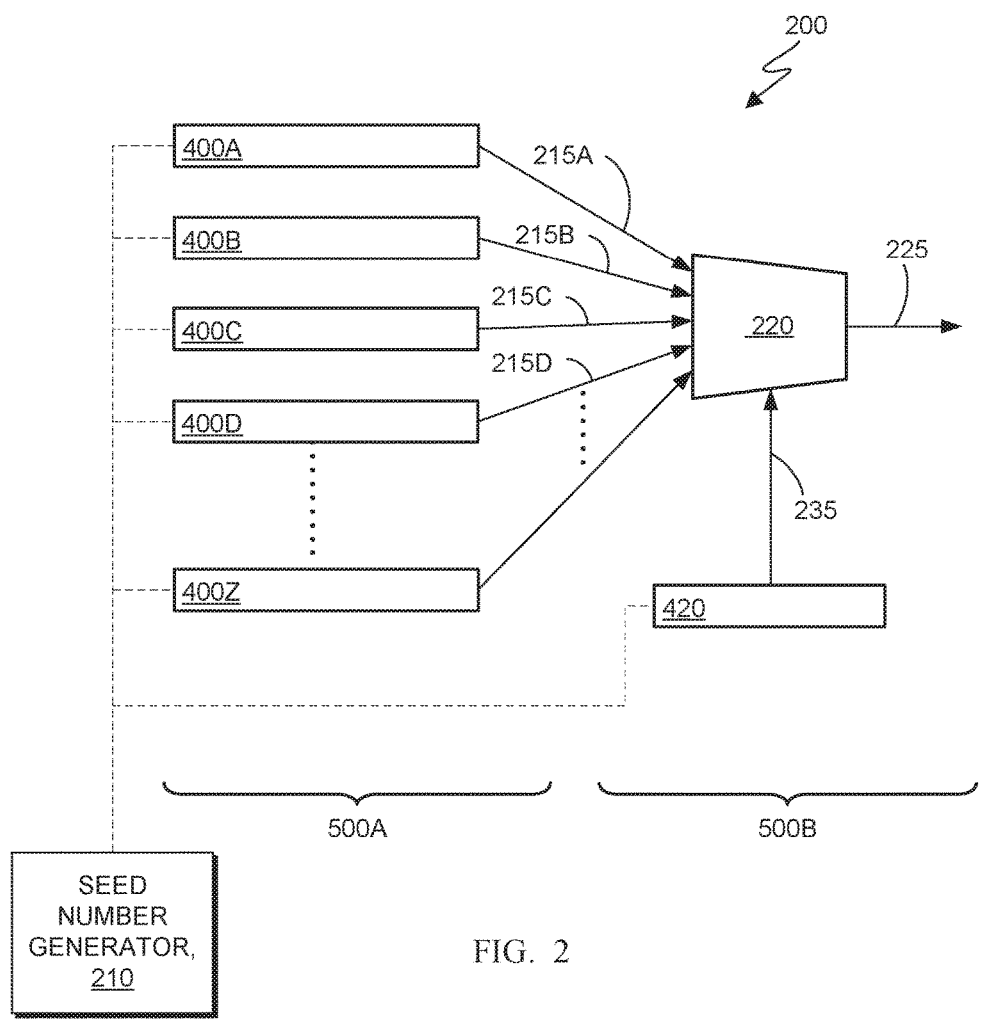
FIG. 2 is a schematic diagram showing a secured pseudo-random number generator in accordance with at least one embodiment of the present invention.

FIG. 2 is a schematic diagram showing secured pseudo-random number generator 200 (secured PRNG 200), in accordance with some embodiments of the present invention. Secured PRNG 200 includes: (i) seed number generator 210; (ii) any number of linear feedback shift registers (LFSRs), 400A-Z, collectively referred to as candidate section 500A (four LFSRs are shown in the Figures for illustrative purposes); (iii) a selector LFSR 420; and (iv) selector 220. Selector LFSR 420 and selector 220 are collectively referred to as selector section 500B. Candidate section 500A and selector section 500B will be discussed in greater detail below, with reference to FIGS. 5A and 5B respectively.

Further with respect to item (ii) in the paragraph above, the greater the number of the LFSR comprising candidate section 500A, the more difficult it may become to predict the output of secured PRNG 200, but the larger the circuit scale becomes in implementing the system. Each of the LFSRs uses a feedback configuration that is unique among the LFSRs of the candidate section. That is, the LFSRs are mutually unique. This ensures that for each cycle, the PRNs generated by the PRNGs are not correlated with each other. In some embodiments of the present invention, the LFSRs of candidate section 500A may include different types of pseudo-random number generators (other than LFSRs). In any case, the LFSRs (or PRNGs of other types) of the candidate section are uniquely configured to ensure that there is no correlation among their outputs.

Embodiments described herein are generally focused on LFSRs as the pseudo-random number generators. It is to be understood that LFSRs, and/or other types of pseudo-random number generator may be adapted and modified without departing from the generic concept, and therefore, such adaptations and modifications should be, and are intended to be comprehended within the meaning and range of equivalents of the disclosed embodiments. It is to be further understood that the phraseology or terminology employed herein is for the purpose of description and not of limitation. Therefore, while the embodiments of the invention have been described in terms of embodiments, those skilled in the art will recognize that the embodiments of the invention can be practiced with modification within the spirit and scope of the claims.

Secured PRNG 200 generates a continuous sequence of secured pseudo-random numbers in a repeating generation cycle as follows: (i) LFSRs 400A-Z respectively generate candidate PRNs in parallel; (ii) the LFSRs feed the respective candidate PRNs as inputs to selector 220; (iii) selector LFSR 420 generates selector basis 235, and feeds the selector basis to selector 220; (iv) selector 220 selects, from among the candidate PRNs, one of the candidate PRNs, wherein the selection is based at least on selector basis 235; (v) selector 220 outputs the selected candidate PRN as a secured pseudo-random number (PRN 225); and (vi) the generation cycle repeats, resulting in generation of a secured PRN 225 for each generation cycle. Selector basis 235 is derived from all or part of the output of selector LFSR 420.

In general, a LFSR generates a new PRN based on the current state of the LFSR. Generating the new PRN causes the current state of LFSR to be updated to a new state, and the PRN output corresponds to the new state of the LFSR. Upon completing each generation cycle, the new state of the LFSR becomes its current state.

In some embodiments of the present invention, seed number generator module 420 (see FIG. 2) generates at least one seed number (not shown in the Figures) and supplies the seed number(s) to LFSRs 400A-Z, and selector LFSR 420. In some embodiments, all LFSRs (400A-Z, and 420) receive the same seed number. In some embodiments, each LFSR receives a different seed number. In some embodiments, some of the LFSRs, receive the same seed number while other LFSRs receive different seed numbers. Without regard to how the LFSRs are seeded, the first output number from each LFSR is based on its initial state as determined by a seed number that has been provided to it. Thereafter, subsequent output numbers from each LFSR are each based on the previous output number from the LFSR.

Candidate section 500A may be made up of pseudo-random number generators of any suitable type(s), and in any suitable combination. Further, selector LFSR 420 may include pseudo-random number generator(s) of any suitable type(s) and in any suitable combination. However, for illustrative simplicity, the pseudo-random number generators as shown in the Figures, and discussed herein, are made up of linear feedback shift registers (LFSRs). It is to be understood that embodiments of the present invention may use any suitable type(s) of pseudo-random number generator (400A-Z) in candidate section 500A, and in selector section 500B (selector LFSR 420). It is to be further understood that references to LFSR(s) herein and in the Figures, may mean any suitable type(s) of pseudo-random number generator(s) (not limited to LFSR types of PRNG).

Embodiments of the present invention are not limited to using LFSR type pseudo-random number generators, and may use any type(s) of pseudo-random number generators now known or to be developed in the future. Further, while discussion of the output from LFSR type pseudo-random number generators is typically in the form of digital numbers (typically binary numbers), pseudo-random number sequences generated by some embodiments of the present invention may be in other forms now known or to be developed in the future, including analog outputs or digital outputs, and if digital, are not restricted to conventional binary type digital numbers (for example, output numbers may be trinary digital representations of numbers, or numbers based on quantum states).

While each LFSR is depicted in the Figures as a single LFSR, in some embodiments of the present invention, each LFSR may include one or more LFSRs operating in concert. Each LFSR as depicted in the Figures may even include a complete embedded instance of secured PRNG 200.

Selector basis 235 may or may not include all bits in the output number of selector LFSR 420. For example, in an embodiment of the present invention, where candidate section 500A includes exactly four candidate LFSRs, selector basis 235 may include as few as two bits. One reason for this is explained further below, with reference to FIG. 5B.

In some embodiments of the present invention, an output number from a candidate LFSR may be divided into two or more output numbers of shorter bit length. For example, consider candidate LFSR 400A to be of 16-bit length. Numbers generated thereby are of 16-bit length. The 16-bit output number could be divided into two 8-bit numbers, and the two 8-bit numbers could be used as separate candidate numbers being input to selector 220. In general, a pseudo-random number having a bit-length of n (n-bit) can be divided into two pseudo-random numbers having bit lengths of m and n−m. In such cases, the LFSR may produce a PRN sequence that is more difficult to predict, while keeping unchanged the circuit scale and the calculation speed. Further, if an LFSR is of sufficient length, the resultant pseudo-random number generated therefrom can be divided into more than two pseudo-random numbers, for example, into three or four pseudo-random numbers, increasing the quantity of pseudo-random numbers that are generated in each generation cycle.

In conventional LFSRs, a value at which pseudo-random number sequence is started, depends on an initial value given to the LFSR as a seed. In some embodiments of the present invention, the candidate LFSRs (400A-Z) and the selector LFSR 420 are given different seeds (a different seed for each LFSR) every time the secured PRNG 200 is initialized. This may make it more difficult to predict the resulting random number sequence. In some embodiments of the present invention, all the LFSRs of the candidate and selector sections (500A and 500B) are given the same seed at initialization of secured PRNG 200. In cases where a need exists to repeat a PRN sequence, such as may be needed in debugging a circuit design or an application that uses the PRN sequence, the LFSRs are given the same set of seeds as before, and the resulting PRN sequence will be the same as before.

Figure 3:
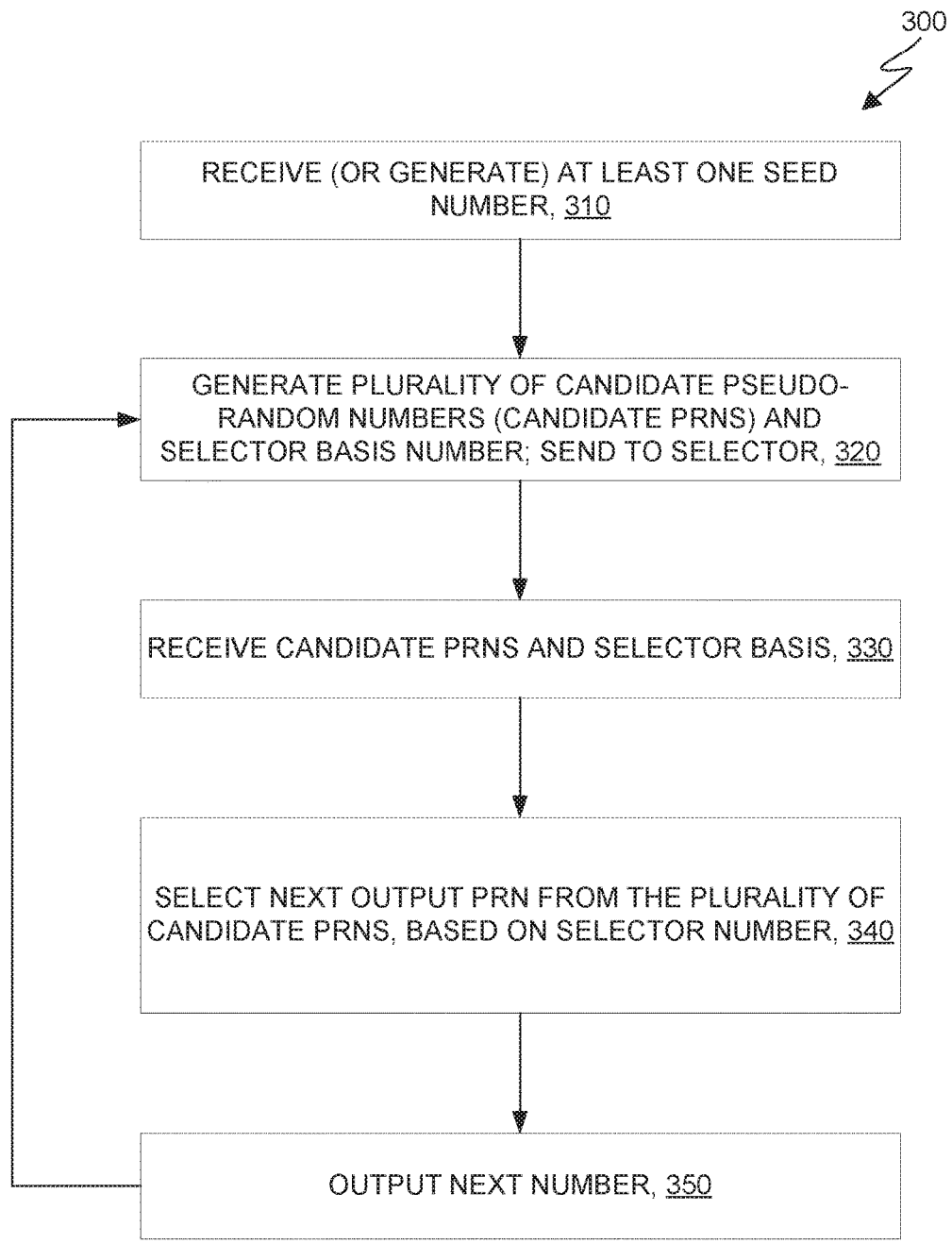
FIG. 3 is a flowchart showing a method in accordance with at least one embodiment of the present invention.
Figure 4A:
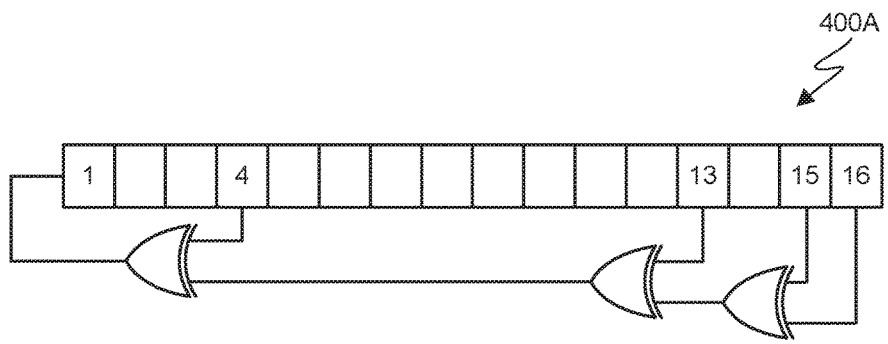
FIG. 4A is a schematic diagram showing a first Fibonacci type linear feedback shift register in accordance with at least one embodiment of the present invention.
Figure 4B:
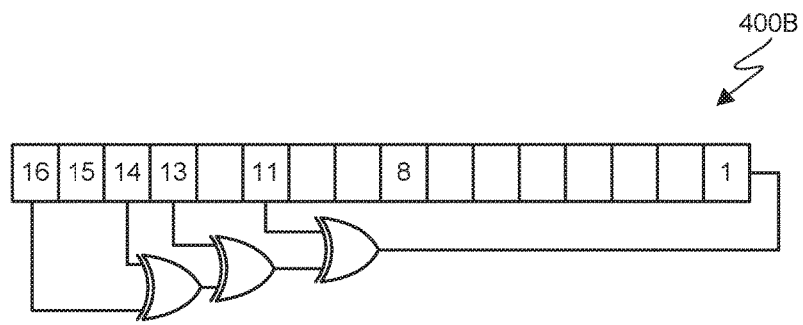
FIG. 4B is schematic diagram showing a second Fibonacci type linear feedback shift register in accordance with at least one embodiment of the present invention.
Figure 4C:
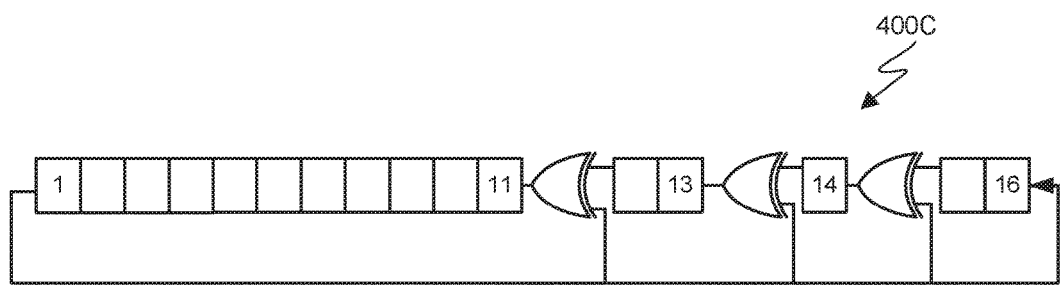
FIG. 4C is a schematic diagram showing a first Galois type linear feedback shift register in accordance with at least one embodiment of the present invention.
Figure 4D:
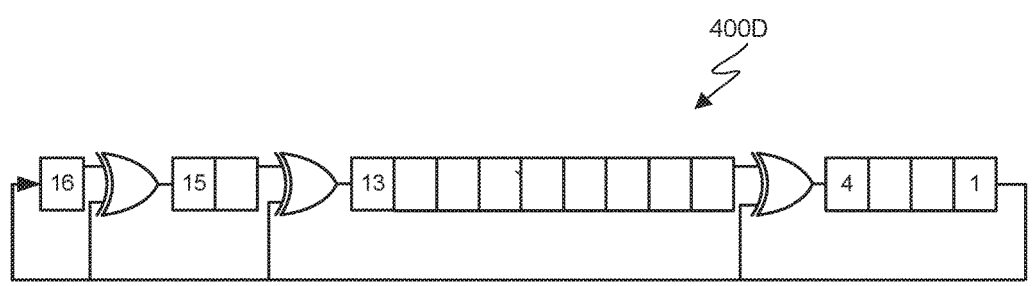
FIG. 4D is a schematic diagram showing a second Galois type linear feedback shift register in accordance with at least one embodiment of the present invention.
Figure 4E:
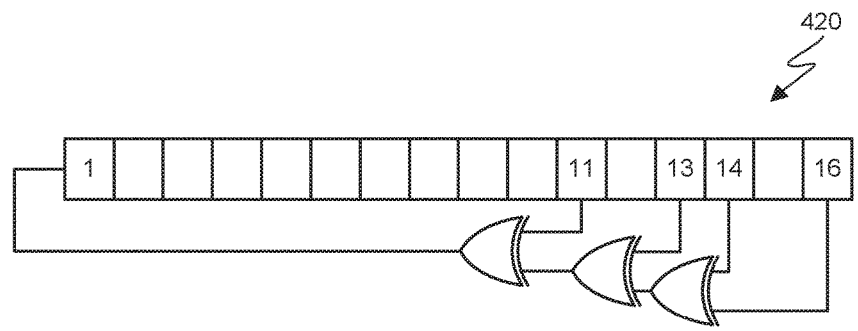
FIG. 4E is a schematic diagram showing a third Fibonacci type linear feedback shift register in accordance with at least one embodiment of the present invention.

Discussion will now continue, with reference to FIG. 3. Flowchart 300 of FIG. 3 shows a method in accordance with some embodiments of the present invention. Processing of a generation cycle (a cycle to generate one pseudo-random number) begins at operation 310 where seed number generator 420, of secured PRNG 200 (see FIG. 2) supplies a seed number to each LFSR to initialize the LFSRs. As discussed above, the seed numbers given to the LFSRs may be the same, or different, in any combination.

Processing proceeds at operation 320 where the LFSRs (400A-Z and 420) each generates a pseudo-random number (PRN). LFSRs 400A-Z send their respectively generated candidate PRN outputs (respectively 215A-Z) to selector 220. Selector LFSR 420 sends at least a portion of its PRN output to selector 220, as selector basis 235. (See FIG. 2).

Processing proceeds at operation 330, where selector 220 receives the candidate PRNs 400A-Z and selector basis 235.

Processing proceeds at operation 340, where selector 220 selects a PRN output based on selector basis 235.

Processing proceeds at operation 350, where selector 220 outputs the selected PRN as a secured PRN 225.

The method of flowchart 300 iterates indefinitely, generating a new secured PRN 225 with each iteration.

Referring to FIGS. 4A-E and 5A-B, an embodiment of the present invention will now be discussed. The embodiment of FIGS. 5A-B, includes four candidate LFSRs (LFSRs 400A-D) and a single selector LFSR (LFSR 420).

One skilled in the relevant arts will recognize LFSRs 400A and 400B as 16-bit Fibonacci linear feedback shift registers (LFSRs), and LFSRs 400C and 400D as 16-bit Galois LFSRs. Both types of LFSR are well known.

In the case of a 16-bit LFSR, it is known that the use of logical expressions $$X^{16}+X^{15}+X^{13}+X^{4}+1 \qquad [1]$$

$$X^{16}+X^{14}+X^{13}+X^{11}+1 \qquad [2]$$

$$X^{32}+X^{30}+X^{26}+X^{25}+1 \qquad [3]$$

where the symbol "+" represents an exclusive-OR (XOR) logical operation. Expression [1] corresponds to LFSRs 400A. Expression [2] corresponds to LFSR 400B respectively. The powers of the terms represent tapped bits. Tapped bits are those bits of a binary number which are inputs to an XOR operation. The "one" in the polynomial corresponds to the input to the first bit (that is, $x^0$, which is equivalent to 1). LFSRs 400A-D and LFSR 420, each generates a pseudo-random number sequence with $2^n-1$ elements.

Size of the LFSR is not limited to 16 bits. For example, expression [3] above represents a 32-bit LFSR (not shown in the figures). Whereas a 16-bit LFSR represented by expressions [1] or [2] above, yields a pseudo-random number sequence of 65,535 ($2^{16}$–1), a 32-bit LFSR represented by expression [3] yields a sequence of 4,294,967, 295 ($2^{32}$–1) pseudo-random numbers.

When initialized with a seed value of 0xACE1 ("0x" means the following digits represent a hexadecimal number), sequences of pseudo-random numbers generated by the respective LFSRs begin as follows:

LFSR 400A: 0xD670, 0xEB38, 0xF59C, 0x7ACE, 0xBD67, . . .

LFSR 400B: 0x0E6A, 0x1CD5, 0x39AA, 0x7354, 0xE6A8, . . .

LFSR 400C: 0xE270, 0x7138, 0x389C, 0x1C4E, 0x0E27, . . .

LFSR 400D: 0x8678, 0x433C, 0x219E, 0x10CF, 0xD86F, . . .

In some embodiments of the present invention, the bit sequence of at least one LFSR is reversed. That is, the pseudo-random numbers generated by the reversed LFSR are in the reverse bit-order as compared to the pseudo-random numbers generated by the non-reversed LFSR. For example, LFSR 400B of FIG. 4B, corresponds to selector LFSR 420 of FIG. 4E, but the bit order of LFSR 400B is the reverse of the bit order of LFSR 420. The PRN sequence given above for LFSR 400B, becomes 0x5670, 0xAB38, 0x559C, 0x2ACE, 0x1567 for selector LFSR 420.

To illustrate the concept of reversing the bit pattern as discussed in the paragraph above, assume the first two words generated by an LFSR (which is initialized with a seed) are 0x5670. The first two words of the LFSR (initialized by the same seed), when the LFSR is reversed, are 0x0E6A. The relationship between these two results is shown by observing the bit pattern corresponding to 0x5670, which is [0101 0110 0111 0000]. The reverse of this bit pattern is [0000 1110 0110 1010], which in hexadecimal notation, is expressed as 0x0E6A.

Figure 5A:
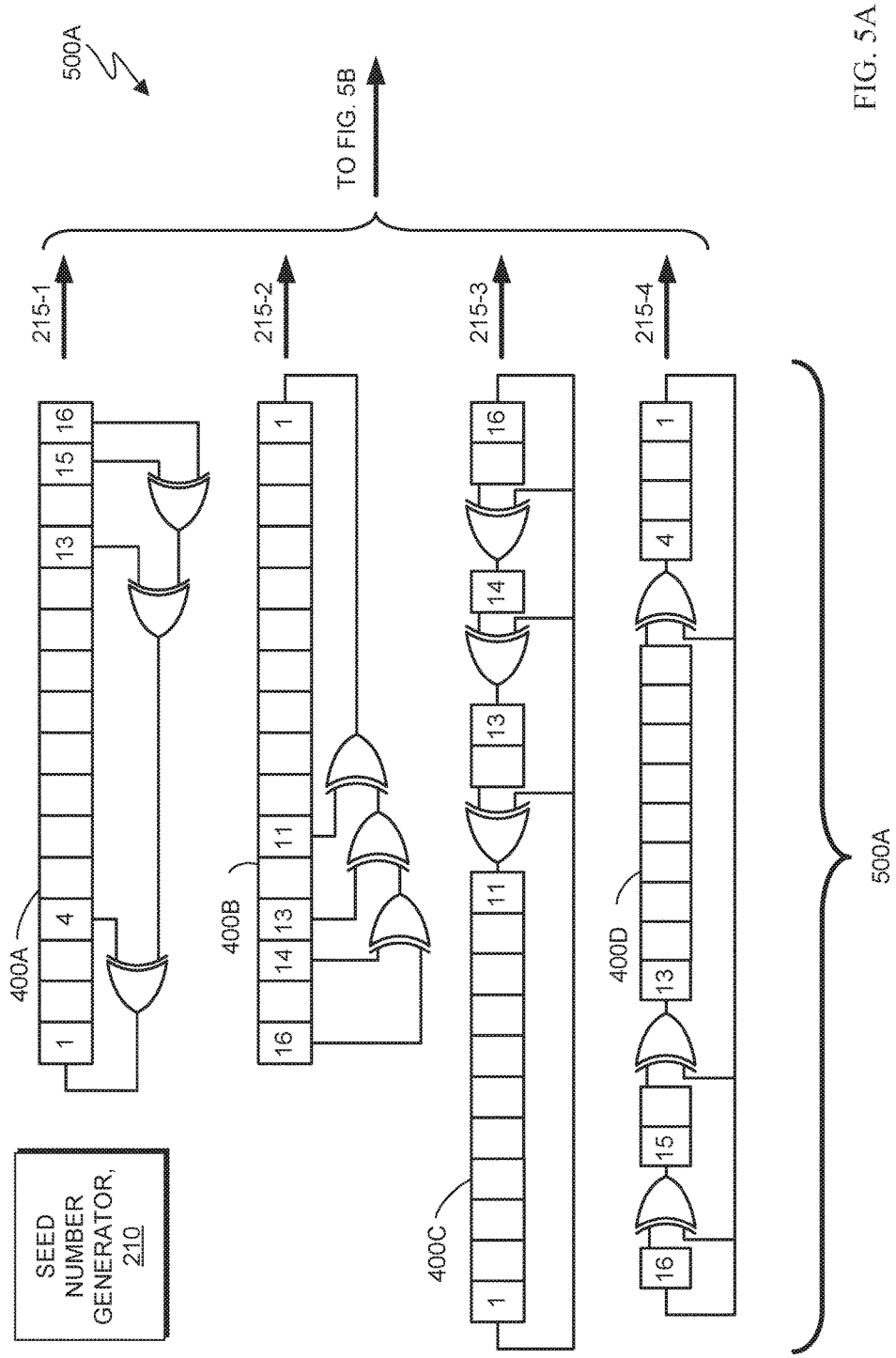
FIG. 5A is a schematic diagram showing a candidate section of a secured pseudo-random number generator in accordance with at least one embodiment of the present invention.
Figure 5B:
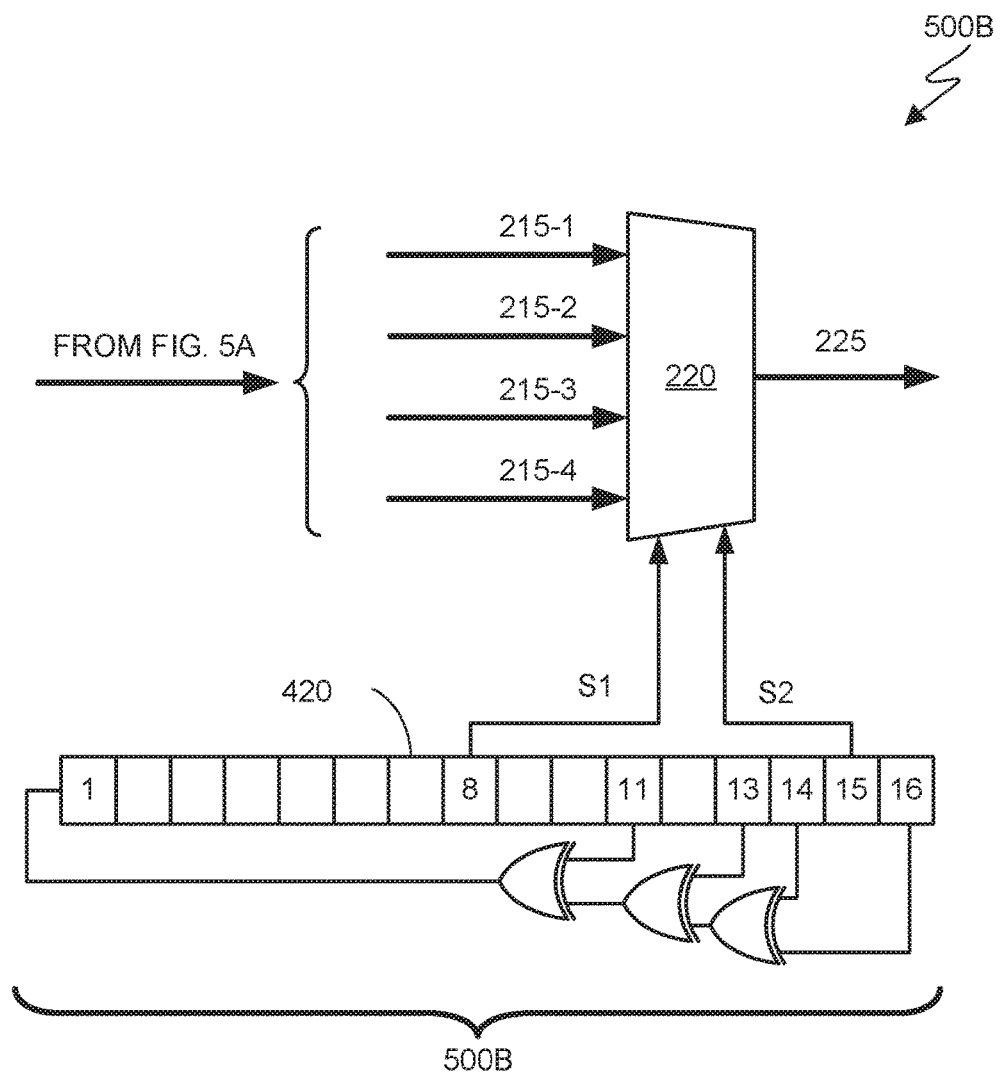
FIG. 5B is a schematic diagram showing a selector section of a secured pseudo-random number generator in accordance with at least one embodiment of the present invention.

With reference to FIGS. 5A and 5B, discussion turns now to candidate section 500A and selector section 500B of secured PRNG 200 as discussed earlier with reference to FIG. 2. In the embodiment of FIG. 5A, candidate section 500A, includes: Fibonacci LFSRs 400A and 400B; Galois LFSRs 400C and 400D; and seed number generator 420. Seed number generator may generate one or more seed numbers. The seed number(s) are transmitted to the LFSRs of candidate section 500A and selector section 500B. In some embodiments, the seed number generator sends the same seed number to all the LFSR. In other embodiments, the seed number generator sends a different seed number to each LFSR. The seed number generator may generate seed number(s) by various ways including: (i) pseudo-randomly by any suitable method; (ii) deterministically, according to programmed instructions; (iii) passively, by receiving seed number input from a user, etc. In some embodiments, the seed number generator is LFSR 420.

With each generation cycle, LFSRs 400A-D generate a set of respective candidate PRNs based on a seed number or based on a previous candidate PRN. Each LFSR contributes one candidate PRN to the set of candidate PRNs. (Note, as discussed above, it is possible for each LFSR to contribute more than one candidate PRN, whereby the full output bit pattern is divided (that is, partitioned) into two, or more, shorter output bit patterns.) For example, a full output bit pattern from a 32-bit LFSR could be partitioned into two 16-bit PRNs. However the candidate PRNs are derived in the candidate section, the LFSRs send their respective candidate PRNs (400A through 400D respectively) to the selector section (via outputs 215A through 215D respectively), to be selected or ignored.

Selector section 500B includes selector 220; and selector LFSR 420. LFSR 420 generates a selector PRN, based on a previous PRN, or on a seed number supplied by seed number generator 420. Selector 220 receives the candidate PRNs from candidate LFSRs 400A-D of candidate section 500A. Selector 220 further receives at least a portion (for example bits 8 and 15) of the selector PRN. Based on the selector PRN (or portion thereof), selector 220 selects one candidate PRN from the candidate PRNs coming from the candidate section. The selector outputs the selected candidate PRN as the next number in a sequence of secured PRNs. With each new generation cycle, the process repeats, generating a new set of candidate PRNs, a new selector PRN, and selecting an output PRN from among the candidate PRNs, based on the selector PRN.

An illustrative example showing generation of a sequence of secured PRNs will now be presented, with reference to output sequence table 600A, and selector mapping table 600B of FIGS. 6A and 6B respectively. Selector mapping table 600B shows how a portion of selector PRN is used by selector 220, to select an output PRN from the candidate PRNs. In the embodiment of FIGS. 5A and 5B, there are four PRNGs (LFSRs 400A-D), and therefore four possible outcomes of each selection process. A minimum of two bits therefore are needed to correspond with the four possible outcomes. Two bits are selected from each selector PRN generated by selector LFSR 420 of FIG. 5B. As shown in FIG. 5B, bits 8 and 15 of selector LFSR 420 are selected as S1 and S2 respectively. The choice to use bits 8 and 15 may be arbitrary and implementation specific, and is not discussed herein. Any pair of bits may be selected as S1 and S2. Further, the pair of bits selected as S1 and S2 may change over time, for example, at each generation cycle.

Selector mapping table 600B shows all possible combinations of S1 and S2. For instance, if on a particular generation cycle S1 and S2 are 1 and 0 respectively (row 603 of the table), candidate PRN 215-3 will be selected as output of secured PRNG 200. If on another generation cycle, S1 and S2 are 1 and 1 respectively (row 604 of the table), candidate PRN 215-4 will be selected.

If more than four (n>4) PRNGs are implemented in candidate section 500A, more than two bits from selector LFSR 420 will be required. For example, if eight PRNGs (n=8) are implemented in the candidate section, at least three bits ($2^3$=8) will be required from the selector PRN. One skilled in the relevant art will immediately recognize that for all the candidate PRNs to have an equal probability of being selected for output, based on a random series of m bits: (i) the number of PRNs (n) should be equal to an integral power of 2; and (ii) the number of bits (m) used to select an output from the PRNs should be equal to log(n) divided by log(2). For example, to select from a set of 16 ($2^4$) candidate PRNs, the selector would need 4 bits $$\log_b(16)/\log_b(2)=4 \qquad [3]$$

where $\log_b$ is the base b logarithm.

Referring now to output sequence table 600A, assume the tabulated sequences of PRNs have been generated by the four LFSRs. For example, in row 400A, hexadecimal numbers generated by LFSR 400A are: D670, EB38, F59C, 7ACE, and BD67 at CYCLE 1 through CYCLE 5 respectively. Similarly, in row 420 (SELECTOR), outputs [S1,S2] from selector LFSR 420 (bits 8 and 15) are shown: [0,0], [1,0], [1,0], [0,0], [1,1] at CYCLE 1 through CYCLE 5 respectively.

The output sequence of secured PRNG 200 is then derived as follows:

For CYCLE 1, refer to table 600A, row 420 (SELECTOR) to find the CYCLE 1 output of selector LFSR 420 [0,0]. Refer to selector mapping table 600B and find the [S1,S2] combination [0,0] in row 601. From the same row, 601, read INPUT LINE SELECTED FOR OUTPUT (215-1). Refer back to table 600A. Select for output the number corresponding to output line 215-1 (D670) under CYCLE 1. Output this number (D670) as the secured PRN generated in CYCLE 1. Repeat the same procedure for CYCLE 2 through CYCLE 5. Table 600A, row OUTPUT SEQUENCE, shows the resultant hexadecimal output of secured PRNG 200 in the foregoing example: D670, 7138, 389C, 7ACE, F61B.

Some embodiments of the present invention, especially embodiments that are designed to produce a sequence of PRNs that is not reproducible, may use pseudo-random number generators other than LFSR type PRNGs. For example, one embodiment is a system in which the candidate PRNs are generated by LFSR type PRNGs as described above, but selector 220 bases its selections not on the output of LFSR 420, but on stray radio frequency signals that are picked up with an antenna and converted to digital form. This is but one, of a great many possible embodiments that are in keeping with the scope and spirit of the present invention.

Figure 7:
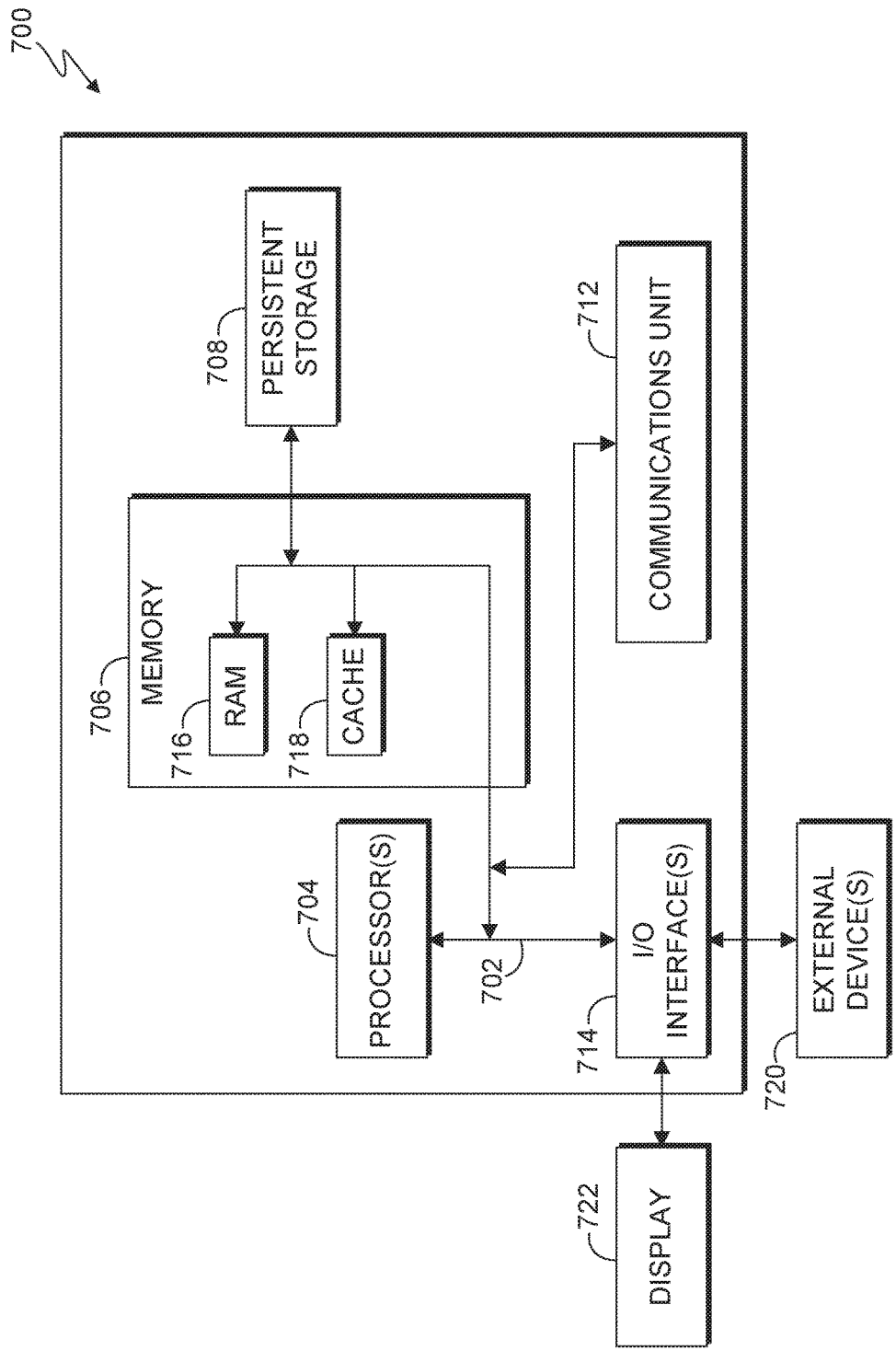
FIG. 7 is a block diagram depicting components of a computer, in accordance with at least one embodiment of the present invention.

FIG. 7 depicts a block diagram of components of computer 700 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

As depicted, the computer 700 includes communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media.

One or more programs may be stored in persistent storage 708 for access and/or execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links.

I/O interface(s) 714 allows for input and output of data with other devices that may be connected to computer 700. For example, I/O interface 714 may provide a connection to external devices 720 such as a keyboard, keypad, a touch screen, and/or some other suitable input device. External devices 720 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 708 via I/O interface(s) 714. I/O interface(s) 714 also connect to a display 722.

Display 722 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimally explain the principles of the embodiment, the practical application or technical improvement over technologies found in the marketplace, or to enable others of ordinary skill in the art to understand the embodiments disclosed herein.

What is claimed is:

1. A method comprising:
receiving, by a selector, a plurality of pseudo-random numbers (PRNs) including a first pseudo-random number (PRN), a second PRN, and a third PRN;
selecting, from the plurality of PRNs, a selected PRN, based at least in part upon the first PRN; and
outputting the selected PRN;
wherein:
the plurality of PRNs are generated by a corresponding plurality of pseudorandom number generators (PRNGs) respectively including a first PRNG, a second PRNG, and a third PRNG; and
a PRNG of the plurality of PRNGs is provided with a different seed each time a random number is generated by the respective PRNG.

2. The method of claim 1, wherein feedback configurations of the first PRNG, the second PRNG and the third PRNG are mutually unique.

3. The method of claim 1, wherein the second PRNG is a Fibonacci linear feedback shift register (LFSR).

4. The method of claim 1, wherein the third PRNG is a Galois LFSR.

5. The method of claim 1, wherein a full PRN generated by a PRNG of the plurality of PRNGs, the full PRN having a length of n bits, is partitioned into two or more PRNs having respective lengths of less than n bits.

6. An apparatus comprising:
a plurality of pseudorandom number generators (PRNGs), including a first PRNG, a second PRNG, and a third PRNG, configured to generate a corresponding plurality of pseudo-random numbers (PRNs) including, respectively, a first pseudo-random number (PRN), a second PRN, and a third PRN; and
a selector, configured to:
receive a plurality of pseudo-random numbers (PRNs) including a first pseudo-random number (PRN), and a second PRN, and a third PRN,
select, from the plurality of PRNs, a selected PRN, based at least in part upon the first PRN, and
output the selected PRN;
wherein the apparatus is configured to provide a different seed to a PRNG of the plurality of PRNGs each time a random number is generated by the respective PRNG.

7. The apparatus of claim 6, wherein the first PRNG, the second PRNG and the third PRNG are mutually uniquely configured.

8. The apparatus of claim 6, wherein the second PRNG is configured as a Fibonacci linear feedback shift register (LFSR).

9. The apparatus of claim 6, wherein the third PRNG is configured as a Galois LFSR.

10. The apparatus of claim 6, configured with respect to a PRN generated by at least one of the plurality of PRNGs, to divide the output of the PRNG having a length of n bits, into two or more PRNs having respective lengths less than or equal to n bits.

11. A computer program product comprising a computer readable storage medium having stored thereon instructions to perform:
receiving, by a selector, a plurality of pseudo-random numbers (PRNs) including a first pseudo-random number (PRN), a second PRN, and a third PRN;
selecting, from the plurality of PRNs, a selected PRN, based at least in part upon the first PRN; and
outputting the selected PRN;
wherein:
the plurality of PRNs are generated by a corresponding plurality of pseudorandom number generators (PRNGs) respectively including a first PRNG, a second PRNG, and a third PRNG; and
a PRNG of the plurality of PRNGs is provided with a different seed each time a random number is generated by the respective PRNG.

12. The computer program product of claim 11, wherein feedback configurations of the first PRNG, the second PRNG and the third PRNG are mutually unique.

13. The computer program product of claim 11, wherein the second PRNG is a Fibonacci linear feedback shift register (LFSR).

14. The computer program product of claim 11, wherein the third PRNG is a Galois LFSR.

15. The computer program product of claim 11, wherein a full PRN generated by a PRNG of the plurality of PRNGs, the full PRN having a length of n bits, is partitioned into two or more PRNs having respective lengths of less than n bits.

16. The computer program product of claim 11 wherein:
the computer program product is a computer system; and
the product further comprises a processor(s) set structured and/or connected in data communication with the storage medium so that the processor(s) set executes computer instructions stored on the storage medium.

* * * * *